M. C. REMINGTON.
Barley-Fork.
No. 64,798.  Patented May 14, 1867.
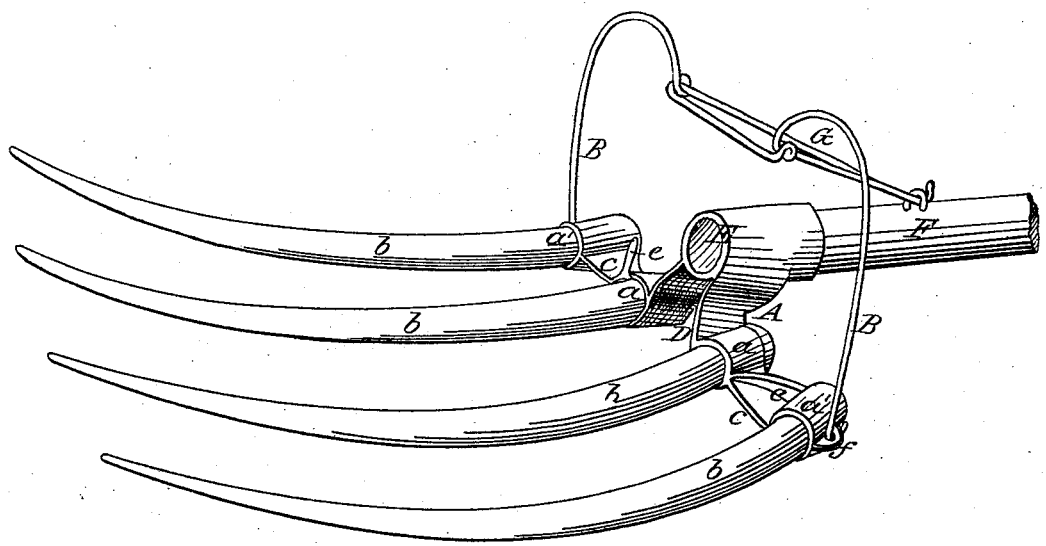
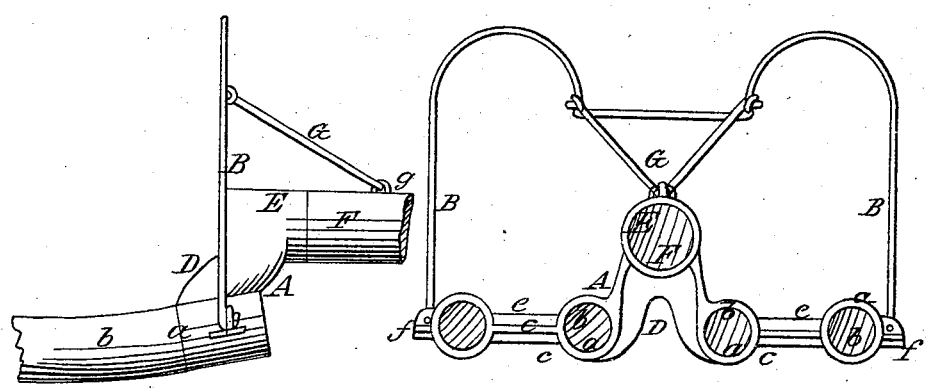
Witnesses:
John K. O'Neil
J. B. Woodruff
Inventor:
M. C. Remington

United States Patent Office

MARTIN C. REMINGTON, OF AUBURN, NEW YORK.

Letters Patent No. 64,798, dated May 14, 1867.

---

BARLEY-FORKS.

---

The Schedule referred to in these Letters Patent and making part of the same.

---

TO ALL WHOM IT MAY CONCERN:

Be it known that I, MARTIN C. REMINGTON, of Auburn, in the county of Cayuga, in the State of New York, have invented certain new and useful improvements in Barley-Forks; and the following is a full, clear, and exact description of the same, reference being had to the accompanying drawings, making a part of this specification, in which—

Figure 1 represents a perspective view of the improved barley-fork.

Figure 2 shows a side elevation of the same.

Figure 3 shows a rear end view.

The object of my invention is to make and supply a cheap, light, durable, and efficient barley-fork, which has advantages over others that have heretofore come to my knowledge. My invention consists in the elevated open socket for inserting and securing the straight fork-handle, the socket setting mainly over the line of a series of tine sockets, and joined to the same by flanges and ribs; the stock or head being constructed, arranged, and combined with a bail or bow, and a brace, as hereinafter more clearly described and set forth.

For the purpose of effectually securing the desired result I make the fork-head A of malleable cast iron, with the sockets $a\ a\ a\ a$, any required number of them, into which the wood tines $b\ b\ b\ b$ are inserted and fastened, the sockets $a\ a\ a\ a$ being so cased that the tines or fingers $b\ b\ b\ b$ radiate to give them the capacity for holding long straw; the fork-head A being so constructed, and the finger-sockets being tapered from the rear, so that each tine or finger is inserted, and when driven in firmly is complete, and in case a finger is broken it can be driven out and another inserted in a very few moments. Between the finger-sockets $a\ a\ a\ a$ the casting is reduced to a thin, flat plate, $c\ c$, with ribs $e\ e$ on both sides, which run diagonally and cross in the centre between the sockets. On the outside edges of the outer sockets $a'\ a'$ I have ears $ff$ cast on them, for the purpose of inserting the bail or bow B B, so that it can be removed at pleasure. In the centre of the fork-head A, I form a ribbed arch, D, for the purpose of elevating the socket E, into which the straight handle F is fitted, the socket E being so inclined as to place a straight handle, F, in the proper position, relative to the curved tines $b\ b$, as to make the operation of the fork easy; the bow B being held in its place in a vertical position by an angular brace, G, which connects with the handle F, by passing through a staple, $g$, driven into the handle, so that the brace G and bow B can both be easily removed or replaced, when desired.

The advantages of my invention are, that the forks can be made cheaper and more efficient by using straight handles or stales; it saves the time, labor, and expense of steaming and bending, and the loss of many by breaking, where the grain of the timber is not perfectly straight, its life and strength being somewhat impaired by the process, so that many bent handles are broken at that point while in use; and farmers are often put to great inconvenience by the breaking of the bent handles in the harvest-fields, a great distance from any place where they can be obtained; but with my improved mode of construction any straight fork handle or stick will answer to supply the deficiency; and furthermore, the position of the handle socket makes a stopping hold for the grain, so that the bail or bow may be removed when desired without materially affecting its utility.

Having thus fully described my invention, what I claim as new, and desire to secure by Letters Patent, is—

The metallic head A, as constructed, with its arch D, and raised socket E, to receive a straight handle, in combination with a bail or bow, B, and brace G, operating in the manner as and for the purposes herein set forth.

MARTIN C. REMINGTON.

Witnesses:
JOHN K. O'NEIL,
J. B. WOODRUFF.